United States Patent
Wang et al.

(10) Patent No.: US 11,960,427 B2
(45) Date of Patent: **\*Apr. 16, 2024**

(54) BRIDGING MODULE, DATA TRANSMISSION SYSTEM, AND DATA TRANSMISSION METHOD

(71) Applicant: Shanghai Zhaoxin Semiconductor Co., Ltd., Shanghai (CN)

(72) Inventors: Jingyang Wang, Beijing (CN); Zhiqiang Hui, Beijing (CN); Guangyun Wang, Beijing (CN)

(73) Assignee: Shanghai Zhaoxin Semiconductor Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/976,859

(22) Filed: Oct. 30, 2022

(65) Prior Publication Data

US 2023/0138839 A1    May 4, 2023

(30) Foreign Application Priority Data

Nov. 2, 2021  (CN) .......................... 202111287829.0

(51) Int. Cl.
*G06F 13/362* (2006.01)
(52) U.S. Cl.
CPC .................................. *G06F 13/362* (2013.01)
(58) Field of Classification Search
CPC .................................................... G06F 13/362
See application file for complete search history.

(56) References Cited

U.S. PATENT DOCUMENTS

| | | |
|---|---|---|
| 2007/0067549 A1 | 3/2007 | Gehman |
| 2011/0055439 A1 | 3/2011 | Chen et al. |
| 2011/0296066 A1 | 12/2011 | Xia |
| 2012/0166730 A1 | 6/2012 | Gehman et al. |
| 2012/0303849 A1 | 11/2012 | Xia |

(Continued)

FOREIGN PATENT DOCUMENTS

CN       110928811       3/2020

OTHER PUBLICATIONS

"Notice of Allowance of Related U.S. Appl. No. 17/976,860", dated Oct. 26, 2023, p. 1-p. 13.

(Continued)

*Primary Examiner* — Henry Tsai
*Assistant Examiner* — John B Roche
(74) *Attorney, Agent, or Firm* — JCIPRNET

(57) ABSTRACT

A bridging module, a data transmission system, and a data transmission method are provided. The bridging module obtains a first read request, and allocates a first data storage space for first return data corresponding to the first read request. The bridging module combines a first master transaction identifier and an address of the first data storage space as a first slave transaction identifier of the first read request, and sends the first read request to a slave device. The bridging module obtains a second read request, and allocates a second data storage space for second return data corresponding to the second read request. The bridging module combines a second master transaction identifier and an address of the second data storage space as a second slave transaction identifier of the second read request, and sends the second read request to the slave device.

30 Claims, 7 Drawing Sheets

(56) References Cited

U.S. PATENT DOCUMENTS

| | | | |
|---|---|---|---|
| 2015/0120502 A1* | 4/2015 | Jung | G06Q 30/0613 |
| | | | 705/26.41 |
| 2015/0120555 A1* | 4/2015 | Jung | G06Q 50/01 |
| | | | 705/44 |
| 2017/0091097 A1* | 3/2017 | Waugh | G06F 12/1027 |
| 2017/0242813 A1 | 8/2017 | Manikfan et al. | |
| 2017/0293567 A1* | 10/2017 | Bryant | G06F 12/0831 |
| 2019/0188164 A1 | 6/2019 | Avrukin et al. | |
| 2020/0089634 A1 | 3/2020 | Jalal et al. | |
| 2020/0402046 A1* | 12/2020 | Streuter | G06Q 20/308 |
| 2023/0136539 A1 | 5/2023 | Wang et al. | |

OTHER PUBLICATIONS

"Office Action of China Counterpart Application", dated Dec. 14, 2023, p. 1-p. 8.

* cited by examiner

BRIDGING MODULE, DATA TRANSMISSION SYSTEM, AND DATA TRANSMISSION METHOD

CROSS-REFERENCE TO RELATED APPLICATION

This application claims the priority benefit of China application serial no. 202111287829.0, filed on Nov. 2, 2021. The entirety of the above-mentioned patent application is hereby incorporated by reference herein and made a part of this specification.

BACKGROUND

Technical Field

The disclosure relates to a data transmission technology, and in particular to a bridging module, a data transmission system, and a data transmission method.

Description of Related Art

The advanced extensible interface (AXI) protocol is a burst-based transmission protocol. The AXI protocol defines 5 independent transmission channels (a read address channel, a read data channel, a write address channel, a write data channel, and a write response channel) to complete data transmission between a master device and a slave device. As shown in FIG. 1, when a master device 120 reads data from a slave device 130, the master device 120 may send a read request REQ1 (including an address of data to be read and control information) to the slave device 130 through the read address channel. Then, the slave device 130 generates return data RD1 according to the read request REQ1, and sends the return data RD1 to the master device 120 through the read data channel. Each data reading process initiated by the master device 120 is referred to as a transaction, and each transaction is identified by a transaction identifier (ID). In the procedure of reading data, the master device 120 generates the transaction ID, and writes the transaction ID into the read request REQ1 to be sent to the slave device 130 through the read address channel. The slave device 130 writes the transaction ID into the generated return data RD1 to be sent the master device 120 together through the read data channel, so as to complete the current data transmission for reading data.

The AXI protocol supports outstanding transmission and out-of-order transmission, but the AXI protocol requires that the transactions with the same ID must be completed in order, while the transactions with different IDs may be completed out of order. For example, as shown in FIG. 1, when the master device 120 intends to read first data and second data from the slave device 130, the read request REQ1 (including the address of the first data and the control information) is first sent to the slave device 130 (corresponding to a transaction T1) through the read address channel. Before the master device 120 receives the return data RD1 (corresponding to the first data), a read request REQ2 (including the address of the second data and the control information) may be sent to the slave device 130 (corresponding to a transaction T2) through the read address channel, which is referred to as the outstanding transmission (that is, the next read request may be sent to the slave device without waiting for the return data of the previously sent read request to return). When the transaction IDs of the transactions T1 and T2 are different, the slave device may send the return data RD1 and RD2 (corresponding to the second data) to the master device 120 in any order (for example, in the order of RD2 and RD1). In this way, the slave device 130 may optimize the data read order (for example, although the order of the read requests received by the slave device is REQ1 and REQ2, if the slave device determines that it will take the shortest time to read data in the order of REQ2 and REQ1 according to its own characteristics and current state, the data may be read in the order of REQ2 and REQ1 instead), so that the processing efficiency of the slave device 130 can be improved, which is referred to as the out-of-order transmission. However, when the transactions T1 and T2 have the same transaction ID, if the slave device 130 sends the return data to the master device 120 in the order of RD2 and RD1, the requirement of the AXI protocol will be violated; and if the slave device sends the return data to the master device 120 in the order of RD1 and RD2, the processing efficiency of the slave device 130 will be reduced.

SUMMARY

The disclosure provides a bridging module, a data transmission system, and a data transmission method.

The disclosure provides a bridging module, which is coupled between a master device and a slave device. The bridging module obtains a first read request. The first read request includes a first master transaction identifier. The bridging module allocates a first data storage space for first return data corresponding to the first read request according to the first master transaction identifier, and combines the first master transaction identifier and an address of the first data storage space as a first slave transaction identifier of the first read request. The bridging module sends the first read request to the slave device. The bridging module obtains a second read request. The second read request includes the first master transaction identifier. The bridging module allocates a second data storage space for second return data corresponding to the second read request according to the first master transaction identifier, and combines the first master transaction identifier and an address of the second data storage space as a second slave transaction identifier of the second read request. The first data storage space is adjacent to the second data storage space, and the first data storage space is in front of the second data storage space. The bridging module sends the second read request to the slave device.

The disclosure provides a data transmission system, which includes a master device, a slave device, and a bridging module. The bridging module is coupled between the master device and the slave device. The bridging module obtains a first read request. The first read request includes a first master transaction identifier. The bridging module allocates a first data storage space for first return data corresponding to the first read request according to the first master transaction identifier, and combines the first master transaction identifier and an address of the first data storage space as a first slave transaction identifier of the first read request. The bridging module sends the first read request to the slave device. The bridging module obtains a second read request. The second read request includes the first master transaction identifier. The bridging module allocates a second data storage space for second return data corresponding to the second read request according to the first master transaction identifier, and combines the first master transaction identifier and an address of the second data storage space as a second slave transaction identifier of the second read request. The first data storage space is adjacent to the second data storage space, and the first data storage space is in front of the second data storage space. The bridging module sends the second read request to the slave device.

The disclosure provides a data transmission method, which includes the following steps. A first read request is obtained. The first read request includes a first master transaction identifier. A first data storage space is allocated for first return data corresponding to the first read request according to the first master transaction identifier, and the first master transaction identifier and an address of the first data storage space are combined as a first slave transaction identifier of the first read request. The first read request is sent to the slave device. A second read request is obtained. The second read request includes the first master transaction identifier. A second data storage space is allocated for second return data corresponding to the second read request according to the first master transaction identifier, and the first master transaction identifier and an address of the second data storage space are combined as a second slave transaction identifier of the second read request. The first data storage space is adjacent to the second data storage space, and the first data storage space is in front of the second data storage space. The second read request is sent to the slave device.

DETAILED DESCRIPTION OF DISCLOSED EMBODIMENTS

Figure 1:
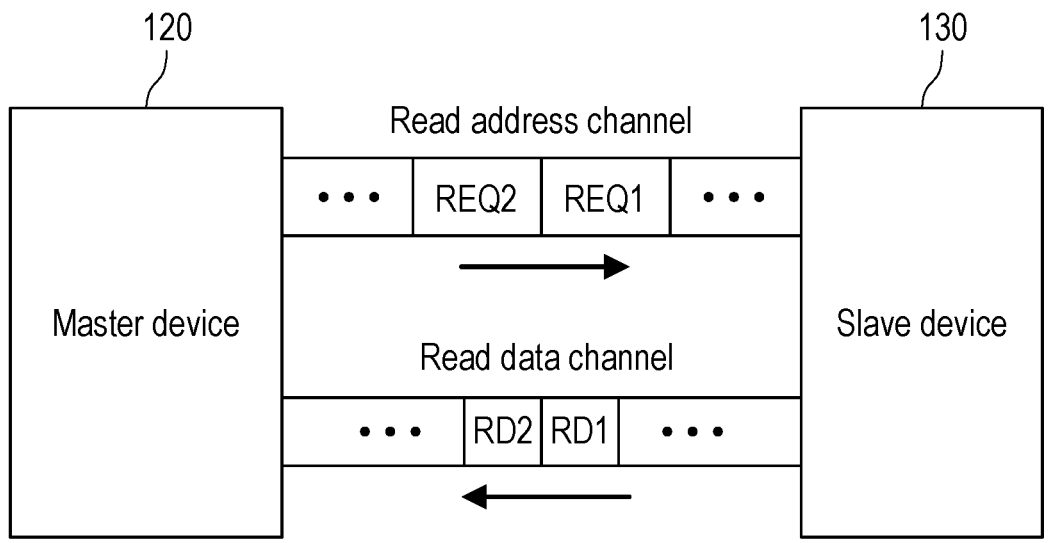
FIG. 1 is the schematic diagram of a master device reading data from a slave device in the prior art.

Reference will now be made in detail to the exemplary embodiments of the disclosure, examples of which are illustrated in the drawings. Wherever possible, the same reference numerals are used in the drawings and description to refer to the same or similar parts.

Ordinal numbers such as "first", "second", and "third" used to modify components in the claims do not imply any priority, prioritized order, order between components, or order of execution of steps of a method, but only as identifiers to distinguish different components with the same name (but different ordinal numbers).

In the disclosure, a bridging module is added between a master device 120 and a slave device 130 shown in FIG. 1. When the master device 120 reads data from the slave device 130 in an outstanding transmission manner, for read requests with the same transaction identifier (ID), the bridging module pre-allocates data storage spaces for corresponding return data in the receiving order of the read requests, and send the return data to the master device 120 in the order thereof in the data storage spaces. The disclosure will be described in detail below.

For ease of reading, some terms used in the following sections are defined as follows.

A master transaction refers to a transaction initiated by the master device. When the master device sends a read request to the bridging module, it means that a master transaction is activated. When the master device receives return data corresponding to the read request, it means that the master transaction is over.

A master transaction ID refers to a transaction ID generated by the master device, included in a read request sent to the bridging module, and used to distinguish from other master transactions.

A slave transaction refers to a transaction generated by the bridging module according to a master transaction. In order to store return data into a data storage space pre-allocated for the return data, the bridging module combines the master transaction ID and information of the corresponding data storage space as a slave transaction ID. When the bridging module sends a read request including the slave transaction ID to the slave device, it means that a slave transaction is activated.

A slave transaction ID refers to a transaction ID generated by the bridging module, included in a read request sent to the slave device, and used to distinguish from other slave transactions.

Figure 2:
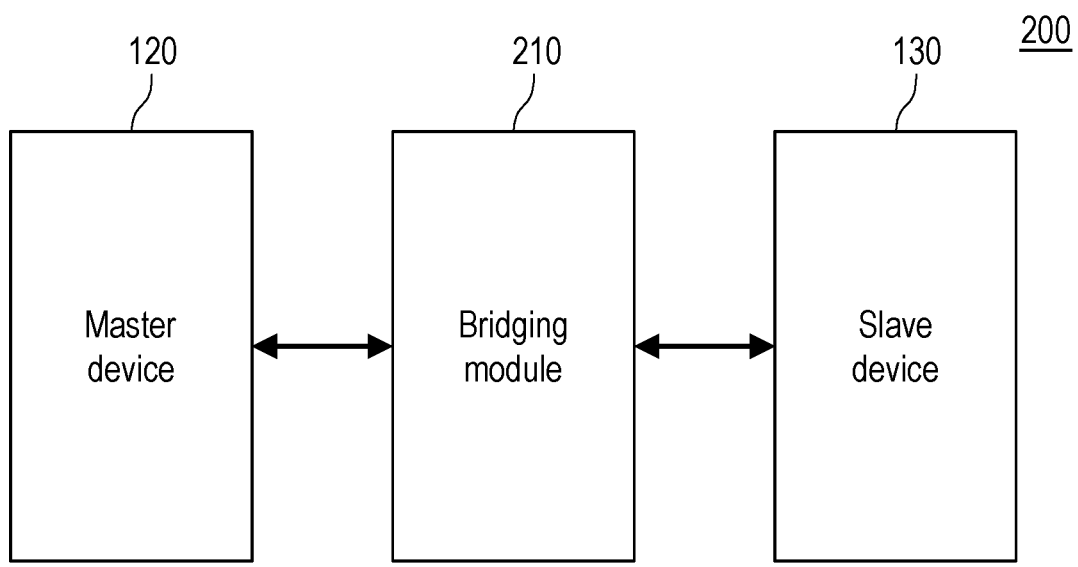
FIG. 2 is a schematic diagram of a structure of a system according to an embodiment of the disclosure.

FIG. 2 is a schematic diagram of a structure of a system according to an embodiment of the disclosure. As shown in FIG. 2, a system 200 may be a system that applies an advanced extensible interface (AXI) bus for data transmission. The system 200 includes a bridging module 210, a master device 120, and a slave device 130. The bridging module 210 is coupled between the master device 120 and the slave device 130, and communicates with the master device 120 and the slave device 130 through the AXI bus. The bridging module 210 is a bridging circuit implemented by a hardware circuit and may be, for example, composed of a related control circuit, multiple buffers, a data transmission interface, etc. In an embodiment, the master device 120 may be, for example, a central processing unit, and the slave device 130 may be, for example, a random access memory (RAM).

Please refer to FIG. 2. When the bridging module 210 receives multiple read requests with the same master transaction ID from the master device 120, a data storage space is first allocated for return data corresponding to each read request in the order of the read requests, and the master transaction ID in the read request and information of the allocated data storage space are combined as a slave transaction ID. The bridging module 210 generates a new read request according to the read request from the master device 120, and uses the slave transaction ID as the slave transaction ID of the newly generated read request. Then, the bridging module 210 sends the newly generated read request to the slave device 130. After receiving the newly generated read request, the slave device 130 generates corresponding return data (including the slave transaction ID), and sends the return data to the bridging module 210. After receiving the return data, the bridging module 210 stores the return data into a pre-allocated data storage space according to information of the data storage space included in the slave transaction ID. How the bridging module in the disclosure reorders the return data will be respectively described in detail below in conjunction with FIGS. 3A, 3B, and 3C and FIGS. 4A, 4B, and 4C.

Figure 3A:
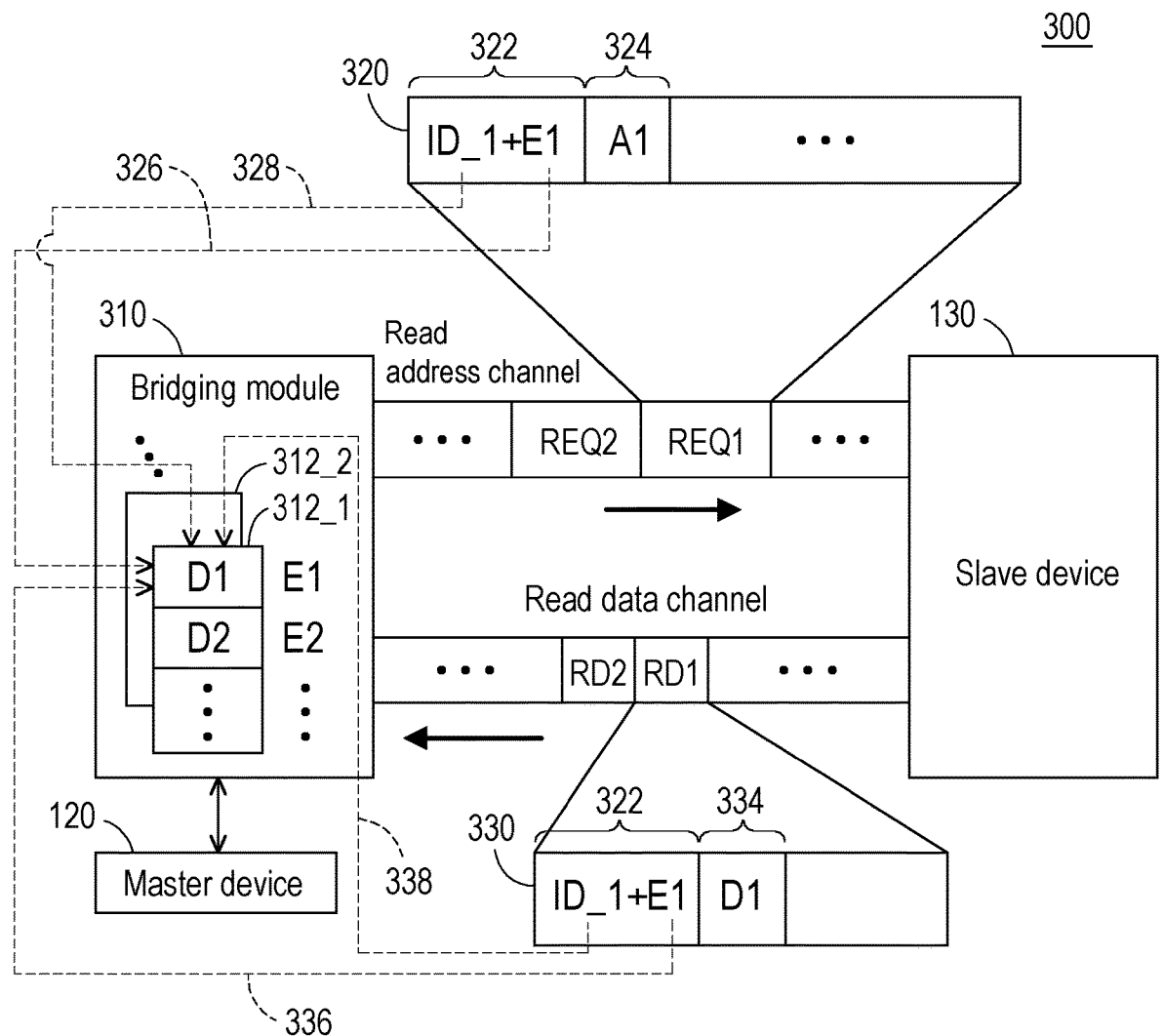
FIGS. 3A to 3C are schematic diagrams of a structure of a system according to an embodiment of the disclosure.
Figure 3B:
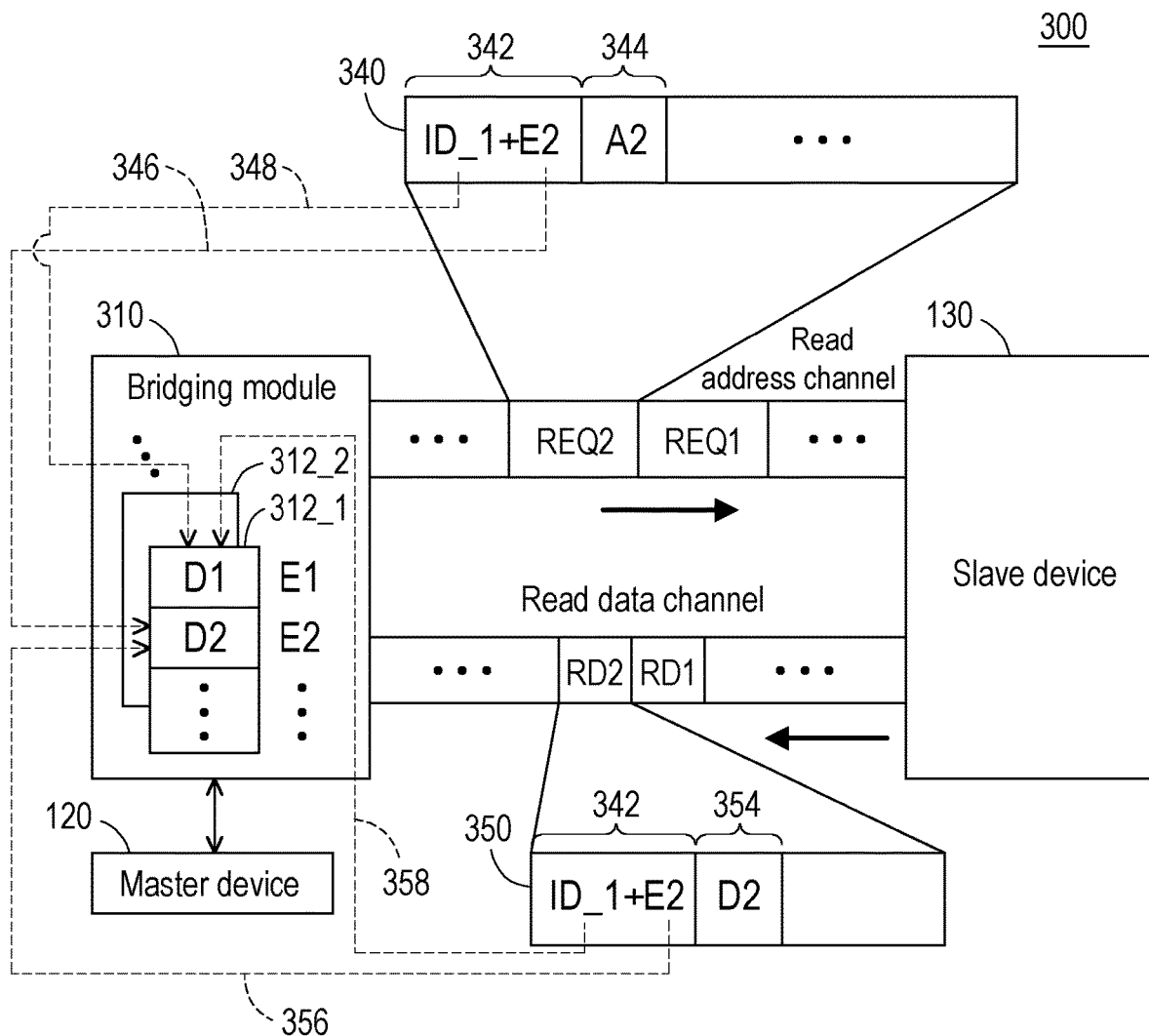
Figure 3C:
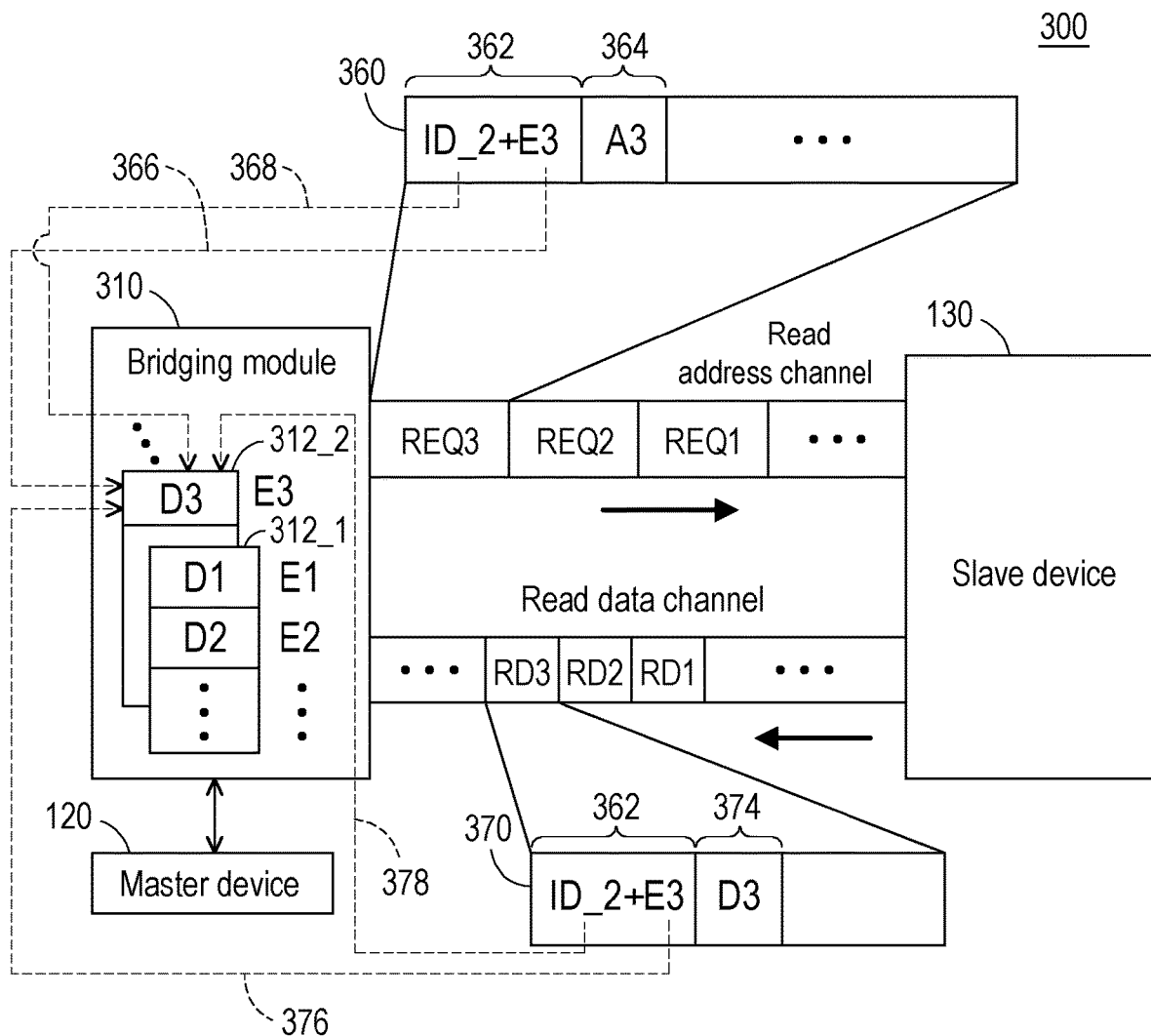

FIGS. 3A to 3C are schematic diagrams of a structure of a system according to an embodiment of the disclosure. As shown in FIG. 3A, a system 300 includes a bridging module 310, a master device 120, and a slave device 130. The bridging module 310 is coupled between the master device 120 and the slave device 130. The bridging module 310 includes a first data storage table 312_1, a second data storage table 312_2, . . . , and so on. Each data storage table includes multiple data storage spaces for storing return data of read requests with the same master transaction identifier. For the convenience of description, the first data storage table 312_1, the second data storage table 312_2, . . . , and so on will be collectively referred to as multiple data storage tables (not labelled in the drawing). As shown in FIG. 3A, the first data storage table 312_1 includes multiple data storage spaces, an address of a first data storage space is E1, and an address of a second data storage space is E2. In an embodiment, all the data storage tables are stored into a static random access memory (SRAM), wherein each data storage table is a first-in, first-out queue.

Please refer to FIGS. 3A, 3B, and 3C at the same time. Taking the processing of a first read request REQ1, a second read request REQ2, and a third read request REQ3 as an example, how the system 300 processes return data (including first return data RD1, second return data RD2, and third return data RD3) will be described.

Please refer to FIG. 3A. The bridging module 310 receives the first read request REQ1 from the master device 120, wherein the first read request REQ1 includes a first master transaction identifier ID_1. Then, the bridging module 310 allocates a first data storage space with an address E1 for the first return data RD1 corresponding to the first read request REQ1 according to the first master transaction identifier ID_1. Specifically, the bridging module 310 selects the first data storage table 312_1 from the data storage tables according to the first master transaction identifier ID_1, and allocates the first data storage space with the address E1 for the first return data RD1 in the first data storage table 312_1 (how to allocate will be described in detail below). Then, the bridging module 310 combines the first master transaction identifier ID_1 and the address E1 of the first data storage space (ID_1+E1) as a first slave transaction identifier 322 of the first read request REQ1. For example, 320 in FIG. 3A illustrates the structure of the first read request REQ1. The first read request REQ1 includes the first slave transaction identifier 322 and a first data address 324. The first slave transaction identifier 322 includes the first master transaction identifier ID_1 and the address E1 of the first data storage space. The bridging module 310 selects the first data storage table 312_1 from the data storage tables according to the first master transaction identifier ID_1 (as shown by a dashed line arrow 328). The bridging module 310 allocates the first data storage space with the address E1 for the first return data RD1 in the first data storage table 312_1 (as shown by a dashed line arrow 326). The first data address 324 is a starting address A1 of the storage space of the return data in the slave device 130.

In an embodiment, the steps of the bridging module 310 selecting the data storage table according to the first master transaction identifier ID_1 and allocating the data storage space are as follows. Whether a data storage table has been assigned to the first master transaction identifier ID_1 is first determined. If a data storage table has not been assigned (the determination result is "No"), a data storage table (for example, the first data storage table 312_1) is assigned to the first master transaction identifier ID_1. If a data storage table has been assigned (the determination result is "Yes"), whether there is enough free space in the data storage table (for example, the first data storage table 312_1) to store the return data RD1 corresponding to the first read request REQ1 is then determined. It is well known to persons skilled in the art that the size of the return data RD1 corresponding to the first master transaction identifier ID_1 may be calculated according to a burst read length (ARLEN) and a burst read size (ARSIZE) in the first read request REQ1, which will not be reiterated here. If the size of the free space of the data storage table assigned to the first master transaction identifier ID_1 is greater than or equal to the size of the return data RD1 corresponding to the first read request REQ1, it means that there is enough free space in the data storage table to store the return data RD1 corresponding to the first read request REQ1, and the bridging module 310 allocates the first data storage space for the first return data RD1. Otherwise, it means that there is no enough free space in the data storage table to store the return data RD1 corresponding to the first read request REQ1, and the bridging module 310 will suspend processing the first read request REQ1. The bridging module 310 will not continue to process the first read request REQ1 until there is enough free space in the data storage table to store the return data RD1 corresponding to the first read request REQ1.

Then, the bridging module 310 sends the first read request REQ1 to the slave device 130. Next, the bridging module 310 receives the second read request REQ2 from the master device 120, wherein the second read request REQ2 also includes the first master transaction identifier ID_1 (that is, the second read request REQ2 and the first read request REQ1 have the same master transaction identifier). Please refer to FIG. 3B. 340 in FIG. 3B illustrates the structure of the second read request REQ2. Since the second read request REQ2 and the first read request REQ1 have the same master transaction identifier, the bridging module 310 selects the first data storage table 312_1 from the data storage tables (as shown by a dashed line arrow 348), and allocates a second data storage space with an address E2 for the second return data RD2 in the first data storage table 312_1 (as shown by a dashed line arrow 346). Then, the bridging module 310 combines the first master transaction identifier ID_1 and the address E2 of the second data storage space (ID_1+E2) as a second slave transaction identifier of the second read request REQ2. The second read request REQ2 includes a second slave transaction identifier 342 and a second data address 344. The second slave transaction identifier 342 includes the first master transaction identifier ID_1 and the address E2 of the second data storage space. The second data address 344 is a starting address A2 of the storage space of the return data RD2 in the slave device 130. Then, the bridging module 310 sends the second read request REQ2 to the slave device 130.

It should be noted that since the first read request REQ1 and the second read request REQ2 have the same master transaction identifier, and the first read request REQ1 is in front of the second read request REQ2, the first data storage space (with the address E1) allocated for the first read request REQ1 and the second data storage space (with the address is E2) allocated for the second read request REQ2 are both located in the first data storage table 312_1 and are adjacent, wherein the first data storage space is in front of the second data storage space. In other words, the return data of the read requests with the same master transaction identifier are stored into the same data storage table in the receiving order of the read requests. No matter when the return data is returned, the return data needs to be stored into the pre-allocated storage space. Therefore, the bridging module 310 only needs to send the return data to the master device 120 in the storing order in the data storage table, so as to satisfy the requirement of the AXI protocol. After the bridging module 310 sends one return data to the master device 120, if the next return data to be sent has not been stored into the data storage table (that is, the slave device 130 has not sent the corresponding return data to the bridging module 310), the bridging module 310 will suspend the operation of sending the return data to the master device 120, and will not send the next return data to be sent to the master device 120 until the next return data to be sent is stored into the data storage table. In this way, the bridging module 310 implements the processing of the return data, and sends the return data to the master device 120 in the receiving order of the corresponding read requests.

When the slave device 130 receives the second read request REQ2, the processing of the first read request REQ1 may have various states: the first read request REQ1 has been processed, is being processed, or has not been processed. The following describes the process of processing the second read request REQ2 by the slave device 130 by taking the example that the slave device 130 has not processed the first read request REQ1. It is assumed that the slave device 130 decides to process the second read request REQ2 first, and then process the first read request REQ1 after determination.

The slave device 130 starts to read data D2 from the address A2 according to the second read request REQ2, generates the second return data RD2 according to the read data D2, and sends the second return data RD2 to the bridging module 310. After receiving the second return data RD2, the bridging module 310 stores the second return data RD2 into the second data storage space according to the address E2 of the second data storage space in the second slave transaction identifier included in the second return data RD2. Please refer to FIG. 3B. 350 in FIG. 3B illustrates the structure of the second return data RD2. The second return data RD2 includes the second slave transaction identifier 342 and second data (D2) 354. The second slave transaction identifier 342 includes the first master transaction identifier ID_1 and the address E2 of the second data storage space, and the value of the second data 354 is D2. The bridging module 310 selects the first data storage table 312_1 according to the first master transaction identifier ID_1 (as shown by a dashed line arrow 358), and stores the data D2 in the second return data RD2 into the second data storage space with the address E2 in the first data storage table 312_1 according to the address E2 of the second data storage space (as shown by a dashed line arrow 356). The following will take the first read request REQ1 as an example to describe in detail the processes of the slave device 130 generating the return data and the bridging module 310 processing the return data. At this time, since the first return data RD1 has not been received, the bridging module 310 cannot send the second return data RD2 to the master device 120.

Please refer to FIG. 3A. The slave device 130 starts to read data D1 from the address A1 according to the first read request REQ1, generates the first return data RD1 according to the read data D1, and sends the first return data RD1 to the bridging module 310. After receiving the first return data RD1, the bridging module 310 stores the data D1 in the first return data RD1 into the first data storage space according to the first master transaction identifier ID_1 and the address E1 of the first data storage space in the first slave transaction identifier 322 included in the first return data RD1 (to be described in detail later). Then, the bridging module 310 first reads the data D1 in the first return data RD1 from the first data storage space with the address E1 in the first data storage table 312_1, sends the data D1 to the master device 120, and sets the first data storage space with the address E1 to a free state (that is, releases the first data storage space with the address E1). Then, the bridging module 310 reads the data D2 in the second return data RD2 from the second data storage space with the address E2 in the first data storage table 312_1, sends the data D2 to the master device 120, and sets the second data storage space with the address E2 to the free state (that is, releases the second data storage space with the address E2).

Please refer to FIG. 3A. Taking the first return data RD1 as an example, how the slave device 130 generates the return data according to the read request and sends the generated return data to the bridging module 310, and how the bridging module 310 stores the received return data will be described in detail.

The slave device 130 obtains the address A1 from the first data address 324 of the first read request REQ1, and calculates a data length LEN (not shown in the drawing, the unit of length is byte) to be read according to the burst read length (ARLEN, not shown in the drawing) and the burst read size (ARSIZE, not shown in the drawing) in the first read request REQ1. From the address A1, the slave device 130 continuously reads the data D1 of LEN bytes, and then combines the first slave transaction identifier (ID_1+E1) and the read data D1 to generate the first return data RD1. 330 in FIG. 3A illustrates the structure of the first return data RD1. The first return data RD1 includes the first slave transaction identifier 322 and first data 334. The first slave transaction identifier 322 includes the first master transaction identifier ID_1 and the address E1 of the first data storage space. The first data 334 includes the data D1.

After receiving the first return data RD1, the bridging module 310 selects the first data storage table 312_1 according to the first master transaction identifier ID_1 in the first slave transaction identifier 322 (as shown by a dashed line arrow 338), and then stores the data D1 in the first return data RD1 into the first data storage space with the address E1 in the first data storage table 312_1 according to the address E1 of the first data storage space in the first slave transaction identifier 322 (as shown by a dashed line arrow 336).

It is worth noting that since the first read request REQ1 corresponding to the first return data RD1 and the second read request REQ2 corresponding to the second return data RD2 have the same master transaction identifier ID_1, after the bridging module 310 stores the second return data RD2 into the second data storage space, if the first return data RD1 has not been received, the bridging module 310 will not send the second return data RD2 to the master device 120, because doing so violates the AXI protocol. In order to satisfy the AXI protocol, after the bridging module 310 receives the first return data RD1 and sends the first return data RD1 to the master device 120, the second return data RD2 may be sent to the master device 120.

In another embodiment, the bridging module 310 receives the read request from the master device 120, and splits the received read request into the first read request REQ1 and the second read request REQ2. Specifically, when the data length requested by the read request from the master device 120 is greater than the data length that can be stored in the return data returned from the slave device 130, the bridging module 310 needs to split the read request from the master device 120 into multiple read requests for processing. For example, we assume that the starting address of the data to be read indicated by a read request from the master device 120 is A, and the requested data length is 100 bytes. In the case where only 50 bytes of data can be stored in the return data from the slave device 130, the read request may be split into the first read request REQ1 and the second read request REQ2, wherein the starting address of the data to be read indicated by the first read request REQ1 is A, the read data length is 50 bytes, the starting address of the data to be read indicated by the second read request REQ2 is A+50, and the read data length is 50 bytes.

In an embodiment, in order to identify the order of the split read requests, the bridging module 310 sets an order number for each read request generated after splitting. For example, the bridging module 310 sets the order numbers of the split read requests to values greater than 0. For example, if the read request is split into 2 split read requests (that is, the number of splitting is 2), the order number of a first split read request is set to 1, the order number of a second split read request is set to 2, and so on. Specifically, the bridging module 310 sets the order number of the read request that does not need to be split to 0. In this way, when receiving the return data, the bridging module 310 may determine whether the received return data corresponds to a split read request according to the order number. If the received return data corresponds to the split read request (that is, the order number is greater than 0), the received return data may be combined into the return data corresponding to the read request before splitting using the order number. If the received return data does not correspond to the split read request (that is, the order number is 0), there is no need to combine the received return data. The detailed description is as follows.

The bridging module 310 sets the order number of the first read request REQ1 to a first order number 1, and combines the first master transaction identifier ID_1, the address E1 of the first data storage space, the first order number 1, and the number of splitting 2 (ID_1+E1+1+2) as a first slave transaction identifier of the first read request REQ1. The bridging module 310 sets the order number of the second read request REQ2 to a second order number 2, and combines the first master transaction identifier ID_1, the address E2 of the second data storage space, the second order number 2, and the number of splitting 2 (ID_1+E2+2+2) as a second slave transaction identifier of the second read request REQ2. Then, according to the aforementioned processing flow, the bridging module 310 sends the first read request REQ1 and the second read request REQ2 to the slave device 130. The slave device 130 processes the first read request REQ1 and the second read request REQ2, respectively generates the first return data RD1 and the second return data RD2, and sends the first return data RD1 and the second return data RD2 to the bridging module 310.

After receiving the first return data RD1 and the second return data RD2, the bridging module 310 combines the first return data RD1 and the second return data RD2 into return data (that is, uses the first return data RD1 and the second return data RD2 as the return data of the same master transaction) according to the first order number 1, the second order number 2, and the number of splitting 2, and sends the return data to the master device 120. For example, after receiving the first return data RD1 and the second return data RD2, the bridging module 310 respectively stores the first return data RD1 and the second return data RD2 into the pre-allocated first data storage space with the address E1 and second data storage space with the address E2 in the first data storage table 312_1. After the bridging module 310 reads one return data (that is, the first return data RD1) from the first data storage table 312_1, according to the first order number 1 and the number of splitting 2 therein, it can be determined that the first return data RD1 is the 1st split read request of a read request and the number of splitting is 2. Then, the bridging module 310 continues to read the next return data (that is, the second return data RD2) from the first data storage table 312_1, according to the second order number 2 and the number of splitting 2 therein, and it can be determined that the second return data is the 2nd split read request of the read request and the return data of all the split read requests of the read request are returned. Then, the bridging module 310 combines the first return data RD1 and the second return data RD2 into the return data, and sends the return data to the master device 120. In another embodiment, the number of splitting corresponding to the read request received from the master device 120 is stored in a splitting table (not shown in the drawing) inside the bridging module 310, and the number of splitting is not stored into the slave transaction identifier, so as to reduce the length of the slave transaction identifier. When processing the return data, the bridging module 310 obtains the number of splitting of each read request from the splitting table, and then combines the return data according to the order of splitting stored in the slave transaction identifier and the number of splitting from the splitting table.

Please refer to FIG. 3C. In another embodiment, when the first return data RD1 and the second return data RD2 corresponding to the first read request REQ1 and the second read request REQ2 have not been sent to the master device, the bridging module 310 receives the third read request REQ3 from the master device 120, wherein the third read request REQ3 includes a second master transaction identifier ID_2. The first master transaction identifier ID_1 is different from the second master transaction identifier ID_2. 360 in FIG. 3C illustrates the structure of the third read request REQ3. The third read request REQ3 includes a third slave transaction identifier 362 and a third data address 364. The third slave transaction identifier 362 includes the second master transaction identifier ID_2 and an address E3 of a third data storage space. The bridging module 310 first selects the second data storage table 312_2 according to the second master transaction identifier ID_2 (as shown by a dashed line arrow 368), and then allocates the third data storage space with the address E3 for the third return data RD3 corresponding to the third read request REQ3 in the second data storage table 312_2 (as shown by a dashed line arrow 366). Then, the bridging module 310 combines the second master transaction identifier ID_2 and the address E3 of the third data storage space (ID_2+E3) as the third slave transaction identifier 362 of the third read request REQ3. It should be noted that since the bridging module 310 has already assigned the first data storage table 312_1 to the first master transaction identifier ID_1, the first data storage table 312_1 can no longer be assigned to the second master transaction identifier ID_2 again. At this time, the second data storage table 312_2 has not been assigned to any master transaction identifier, so the second data storage table 312_2 may be assigned to the second master transaction identifier ID_2, and the third data storage space with the address E3 may be allocated for the third return data RD3 corresponding to the third read request REQ3 in the second data storage table 312_2. The third data address 364 is a starting address A3 of the storage space of the return data RD3 in the slave device 130.

Then, the bridging module 310 sends the third read request REQ3 to the slave device 130. After receiving the third read request REQ3, the slave device 130 starts to read the data D3 from the address A3 according to the third read request REQ3, generates the third return data RD3 according to the read data D3, and then sends the third return data RD3 to the bridging module 310, wherein the third return data RD3 includes a third slave transaction identifier 362. 370 in FIG. 3C illustrates the structure of the third return data RD3. The third return data RD3 includes the third slave transaction identifier 362 and third data (D3) 374. The third slave transaction identifier 362 includes the second master transaction identifier ID_2 and the address E3 of the third data storage space. The third data 374 includes the data D3. The bridging module 310 selects the second data storage table 312_2 according to the second master transaction identifier ID_2 in the third slave transaction identifier 362 included in the third return data RD3 (as shown by a dashed line arrow 378), and stores the data D3 in the third return data RD3 into the third data storage space with the address E3 in the second data storage table 312_2 (as shown by a dashed line arrow 376). As for how the slave device 130 starts to read the data D3 from the address A3 according to the third read request REQ3, generates the third return data RD3 according to the read data D3, and sends the third return data RD3 to the bridging module 310, and how the bridging module 310 stores the third return data RD3, the steps of which are the same as the steps of the processing of the first read request REQ1/the second read request REQ2, which will not be reiterated here.

After storing the third return data RD3, the bridging module 310 may directly send the third return data RD3 to the master device 120 without receiving the first return data RD1 or the second return data RD2. Specifically, since the third return data RD3 and the first return data RD1/the second return data RD2 have different master transaction identifiers, according to the AXI protocol, the bridging module 310 may directly send the third return data RD3 to the master device 120 regardless of whether the first return data RD1/the second return data RD2 has been sent to the master device 120.

Figure 4A:
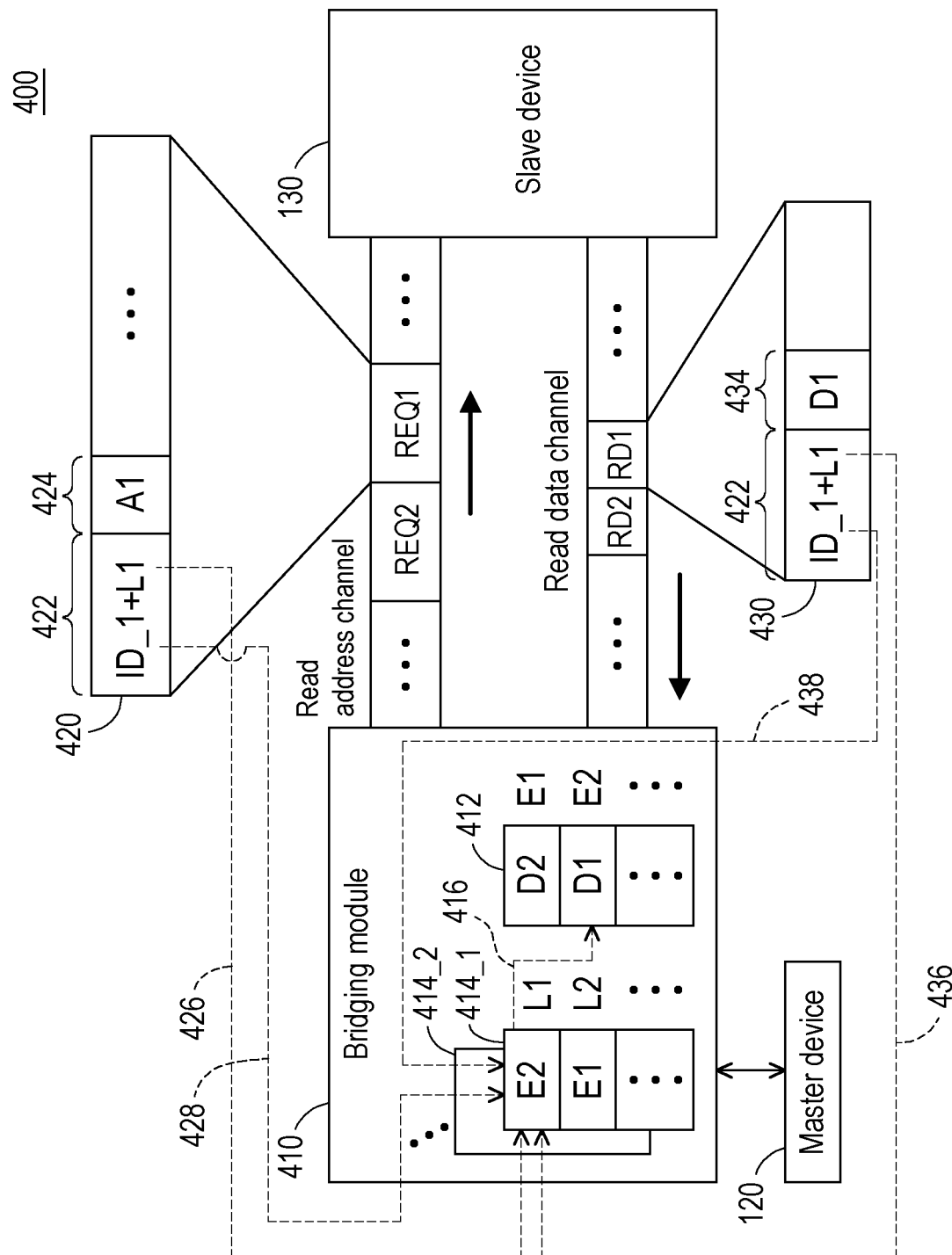
FIGS. 4A to 4C are schematic diagrams of a structure of a system according to another embodiment of the disclosure.
Figure 4B:
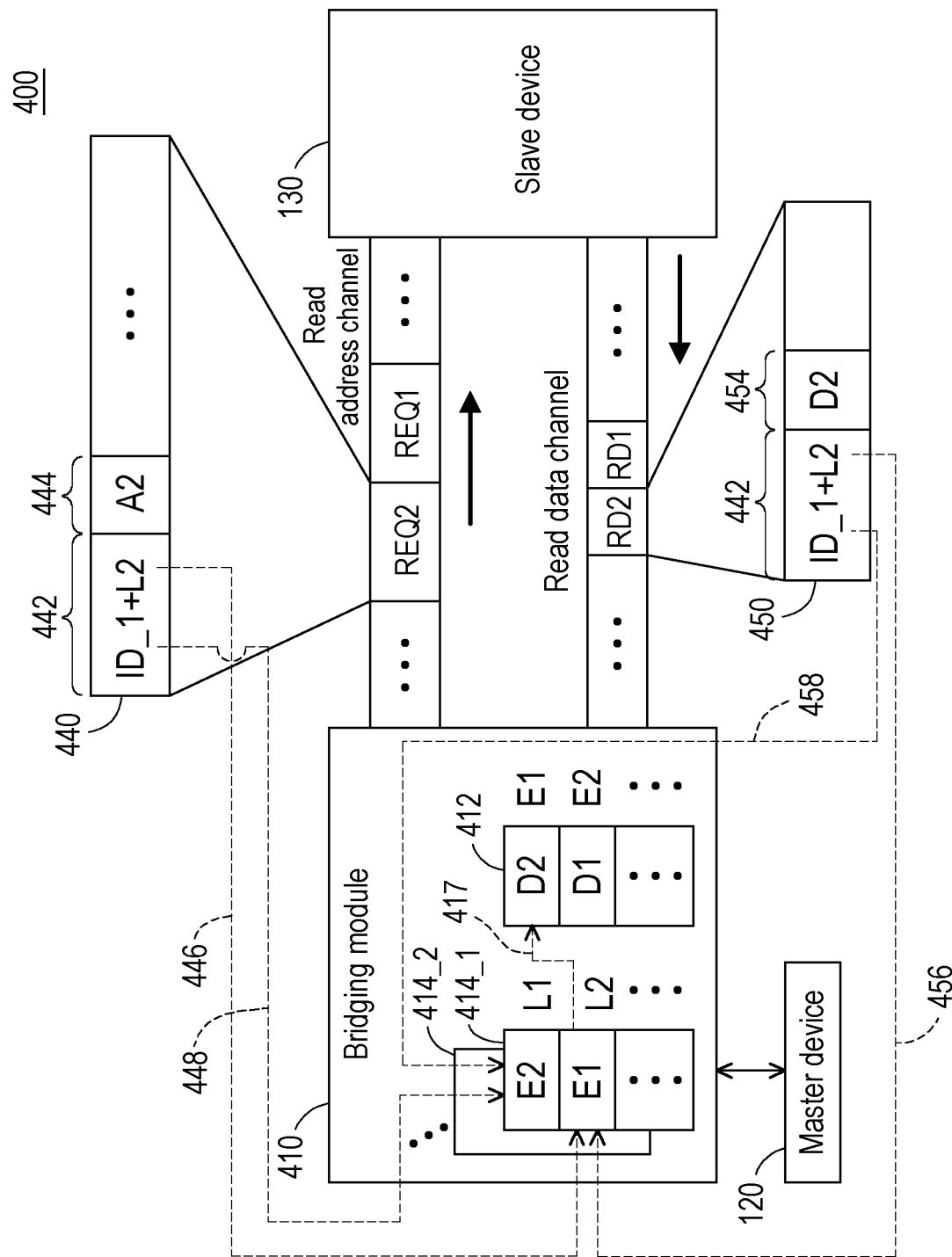
Figure 4C:
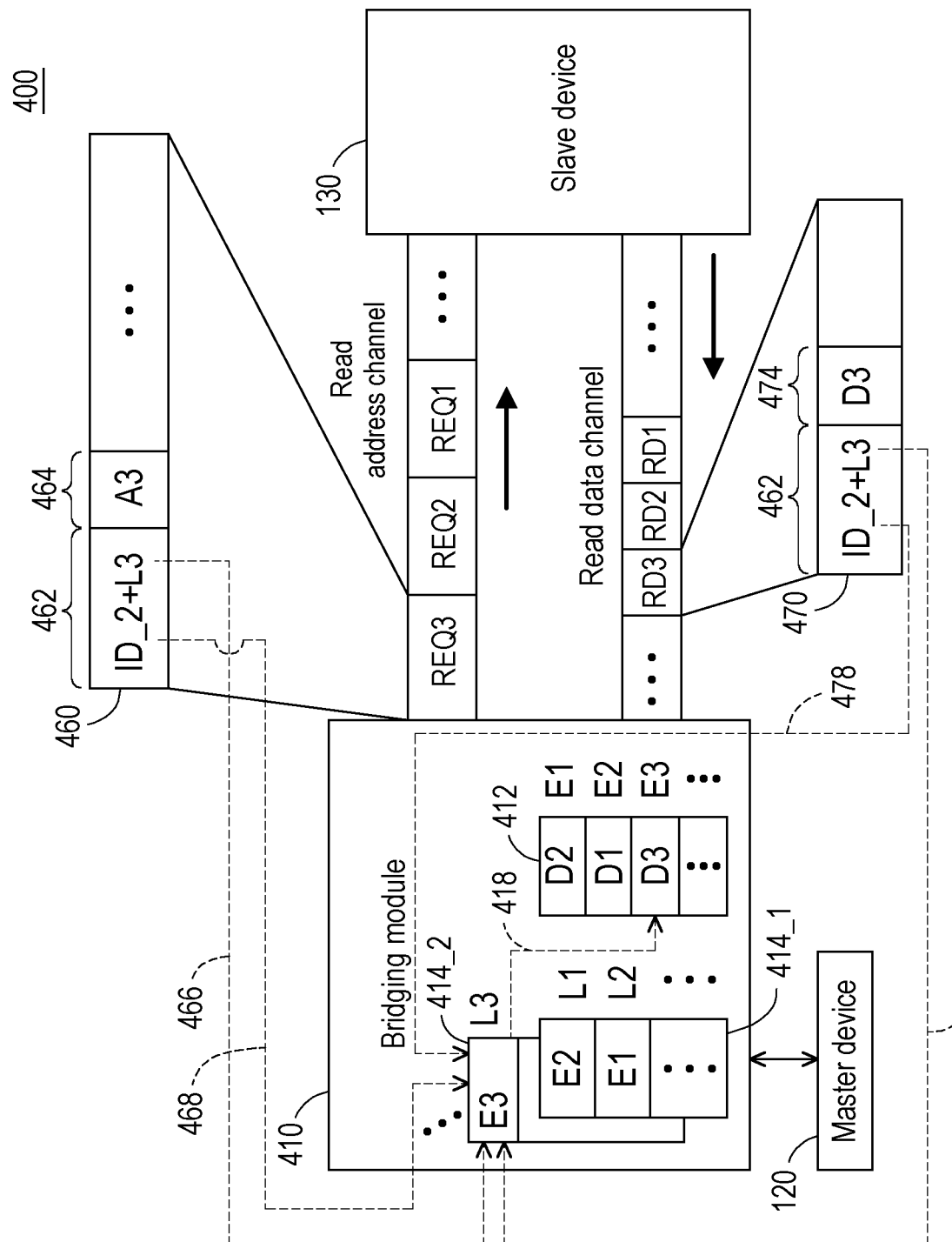

FIGS. 4A to 4C are schematic diagrams of a structure of a system according to another embodiment of the disclosure. Different from the system 300 shown in FIGS. 3A to 3C, in a system 400 shown in FIGS. 4A to 4C, a bridging module 410 only includes one data storage table 412 and includes multiple location storage tables such as a location storage table 414_1, a location storage table 414_2, . . . , and so on, and a slave transaction identifier includes an address of a location storage space (instead of the address of the data storage space). For the convenience of the following description, the location storage table 414_1, the location storage table 414_2, . . . , and so on are collectively referred to as multiple location storage tables 414 (not labelled in the drawing).

Please refer to FIGS. 4A to 4C. Taking the processing of the first read request REQ1, the second read request REQ2, and the third read request REQ3 as an example, how the system 400 processes the return data (including the first return data RD1, the second return data RD2, and the third return data RD3) is described.

As shown in FIG. 4A, the bridging module 410 receives the first read request REQ1 from the master device 120, wherein the first read request REQ1 includes the first master transaction identifier ID_1. The bridging module 410 allocates a first location storage space with an address L1 for the first return data RD1 corresponding to the first read request REQ1 according to the first master transaction identifier ID_1, and allocates a first data storage space with the address E2 for the first return data RD1. Then, the address E2 of the first data storage space is stored into the first location storage space, and the first master transaction identifier ID_1 and the address L1 of the first location storage space are combined as a first slave transaction identifier (ID_1+L1) of the first read request REQ1. Specifically, 420 in FIG. 4A illustrates the structure of the first read request REQ1. The first read request REQ1 includes a first slave transaction identifier 422 and a first data address 424. The first slave transaction identifier 422 includes the first master transaction identifier ID_1 and the address L1 of the first location storage space. The bridging module 410 selects the first location storage table 414_1 according to the first master transaction identifier ID_1 (as shown by a dashed line arrow 428), and allocates the first location storage space with the address L1 for the first return data RD1 in the first location storage table 414_1 (as shown by a dashed line arrow 426). Then, the bridging module 410 allocates the first data storage space with the address E2 for the first return data RD1 in the data storage table 412, and stores the address E2 of the first data storage space into the first location storage space with the address L1 (as shown by a dashed line arrow 416).

In an embodiment, the steps of selecting the location storage table according to the first master transaction identifier ID_1 and allocating the location storage space are as follows. Whether a location storage table has been assigned for the first master transaction identifier ID_1 is first determined. If a location storage table has not been assigned (the determination result is "No"), a location storage table (for example, the first location storage table 414_1) is assigned to the first master transaction identifier ID_1. If a location storage table has been assigned (the determination result is "Yes"), whether there is enough free space in the location storage table assigned to the first master transaction identifier ID_1 to store an address of a data storage space of return data corresponding to the first master transaction identifier ID_1, and whether there is enough free space in the data storage table 412 to store the return data corresponding to the first master transaction identifier ID_1 are determined. If the determination result is "Yes", the bridging module 410 allocates the first location storage space and the first data storage space for the first return data RD1, and then writes the address of the allocated first data storage space into the allocated first location storage space. Otherwise, the bridging module 410 will suspend the processing of the first read request REQ1, and the bridging module 410 will not continue to process the first read request REQ1 until there is enough free space in the first location storage table assigned to the first master transaction identifier ID_1 to store the address of the data storage space of the return data RD1 corresponding to the first master transaction identifier ID_1, and there is enough free space in the data storage table 412 to store the return data corresponding to the first master transaction identifier ID_1.

Then, the bridging module 410 sends the first read request REQ1 to the slave device 130. Next, the bridging module 410 receives the second read request REQ2 from the master device 120, wherein the second read request REQ2 also includes the first master transaction identifier ID_1 (that is, the second read request REQ2 and the first read request REQ1 have the same master transaction identifier). 440 in FIG. 4B illustrates the structure of the second read request REQ2. The second read request REQ2 includes a second slave transaction identifier 442 and a second data address 444. The second slave transaction identifier 442 includes the first master transaction identifier ID_1 and an address L2 of a second location storage space. Since the second read request REQ2 and the first read request REQ1 have the same master transaction identifier, the bridging module 410 selects the first location storage table 414_1 from the location storage tables 414 (as shown by a dashed line arrow 448), and allocates the second location storage space with the address L2 for the second return data RD2 (as shown by a dashed line arrow 446). Then, the bridging module 410 allocates a second data storage space with the address E1 for the second return data RD2 in the data storage table 412, and writes the address E1 of the allocated second data storage space into the second location storage space with the address L2 (as shown by a dashed line arrow 417). Then, the bridging module 410 combines the first master transaction identifier ID_1 and the address L2 of the second location storage space (ID_1+L2) as the second slave transaction identifier 442 of the second read request REQ2. The second data address 444 is the starting address A2 of the storage space of the return data RD2 in the slave device 130. Then, the bridging module 410 sends the second read request REQ2 to the slave device 130.

It should be noted that since the first read request REQ1 and the second read request REQ2 have the same master transaction identifier, and the first read request REQ1 is in front of the second read request REQ2, the first location storage space (with the address L1) allocated for the first read request REQ1 is adjacent to the second location storage space (with address L2) allocated for the second read request REQ2, and the first location storage space is in front of the second location storage space. In other words, storage location information of the return data of the read requests with the same master transaction identifier is stored in the same location storage table in the receiving order of the read requests. No matter when the return data is returned, the storing order of the location information thereof in the location storage table will not change. Therefore, the bridging module 410 only needs to send the return data to the master device 120 in the storing order in the location storage table, so as to satisfy the requirement of the AXI protocol. After the bridging module 410 sends one return data to the master device 120, if the next return data to be sent has not been stored into the data storage table (that is, the slave device 130 has not sent the corresponding return data to the bridging module 410), the bridging module 410 will suspend the operation of sending the return data to the master device 120, and will not send the next return data to be sent to the master device 120 until the next return data to be sent is stored into the data storage table. In this way, the bridging module 410 implements the processing of the return data, and sends the return data to the master device 120 in the receiving order of the corresponding read requests.

Similar to the embodiment shown in FIGS. 3A to 3C, the embodiment shown in FIGS. 4A to 4C also assumes that the slave device 130 decides to process the second read request REQ2 first, and then process the first read request REQ1 after determination.

The slave device 130 generates the second return data RD2 according to the second read request REQ2, and then sends the second return data RD2 to the bridging module 410. After receiving the second return data RD2, the bridging module 410 stores the second return data RD2 into the second data storage space according to the address L2 of the second location storage space in the second slave transaction identifier 442 included in the second return data RD2. Please refer to FIG. 4B. 450 in FIG. 4B illustrates the structure of the second return data RD2. The second return data RD2 includes the second slave transaction identifier 442 and second data 454. The second slave transaction identifier 442 includes the first master transaction identifier ID_1 and the address L2 of the second location storage space, and the second data 454 is D2. The bridging module 410 selects the first location storage table 414_1 according to the first master transaction identifier ID_1 (as shown by a dashed line arrow 458), reads the address E1 from the first location storage table 414_1 according to the address L2 of the second location storage space (as shown by a dashed line arrow 456), and then stores the second return data RD2 into the second data storage space with the address E1 in the data storage table 412 (as shown by the dashed line arrow 417). The following will take the first read request REQ1 as an example to describe in detail the processes of the slave device 130 generating the return data and the bridging module 410 processing the return data. At this time, since the first return data RD1 has not been received, the bridging module 410 cannot send the second return data RD2 to the master device 120.

The slave device 130 starts to read the data D1 from the address A1 according to the first read request REQ1, generates the first return data RD1 according to the read data D1, and then sends the first return data RD1 to the bridging module 410. After receiving the first return data RD1, the bridging module 410 stores the first return data RD1 into the first data storage space according to the first master transaction identifier ID_1 and the address L1 of the first location storage space in the first slave transaction identifier 422 included in the first return data RD1 (to be described in detail later). Then, the bridging module 410 first reads the data D1 in the first return data RD1 from the first data storage space, sends the data D1 to the master device 120, and sets the corresponding first data storage space and first location storage space to a free state (that is, releases the corresponding first data storage space and first location storage space). Then, the second return data RD2 is read from the second data storage space, the second return data RD2 is sent to the master device 120, and the corresponding second data storage space and second location storage space are set to the free state (that is, the corresponding second data storage space and second location storage space are released).

Please refer to FIG. 4A. Taking the first return data RD1 as an example, how the slave device 130 generates the return data according to the read request and sends the generated return data to the bridging module 410, and how the bridging module 410 stores the received return data will be described in detail.

The slave device 130 obtains the address A1 from the first data address 424 of the first read request REQ1, and calculates a data length LEN (not shown in the drawing, the unit of length is byte) to be read according to the burst read length (ARLEN, not shown in the drawing) and the burst read size (ARSIZE, not shown in the drawing) in the first read request REQ1. From the address A1, the slave device 130 continuously reads the data D1 of LEN bytes, and then combines the first slave transaction identifier (ID_1+L1) and the read data D1 to generate the first return data RD1. 430 in FIG. 4A illustrates the structure of the first return data RD1. The return data RD1 includes the first slave transaction identifier 422 and first data 434. The first slave transaction identifier 422 includes the first master transaction identifier ID_1 and the address L1 of the first location storage space. The first data 434 includes the data D1.

After receiving the first return data RD1, the bridging module 410 selects the first location storage table 414_1 according to the first master transaction identifier ID_1 (as shown by a dashed line arrow 438), then reads the address E2 of the first data storage space from the first location storage table 414_1 according to the address L1 of the first location storage space in the first slave transaction identifier 422 (as shown by a dashed line arrow 436), and stores the data D1 in the first return data RD1 into the first data storage space with the address E2 (as shown by the dashed line arrow 416).

It is worth noting that since the first read request REQ1 corresponding to the first return data RD1 and the second read request REQ2 corresponding to the second return data RD2 have the same master transaction identifier ID_1, after the bridging module 410 stores the second return data RD2 into the second data storage space, if the first return data RD1 has not been received, the bridging module 410 will not send the second return data RD2 to the master device 120, because doing so violates the AXI protocol. In order to satisfy the AXI protocol, after the bridging module 410 receives the first return data RD1 and sends the first return data RD1 to the master device 120, the second return data RD2 may be sent to the master device 120.

In another embodiment, the bridging module 410 receives the read request from the master device 120, and splits the received read request into the first read request REQ1 and the second read request REQ2. Specifically, when the data length requested by the read request from the master device 120 is greater than the data length that can be stored in the return data returned from the slave device 130, the bridging module 410 needs to split the read request received from the master device into multiple requests for data transmission. As for how to split the read request, the foregoing description has been made in conjunction with FIGS. 3A to 3C, which will not be reiterated here.

In order to identify the order of the split read requests, the bridging module 410 sets an order number for each read request generated after splitting. For example, the bridging module 410 sets the order number of the first read request REQ1 to the first order number 1, and combines the first master transaction identifier ID_1, the address L1 of the first location storage space, the first order number 1, and the number of splitting 2 (ID_1+L1+1+2) as the first slave transaction identifier of the first read request REQ1. The bridging module 410 sets the order number of the second read request REQ2 to the second order number 2, and combines the first master transaction identifier, the address L2 of the second location storage space, the second order number 2, and the number of splitting 2 (ID_1+L2+2+2) as the second slave transaction identifier of the second read request REQ2. Then, according to the aforementioned processing flow, the bridging module 410 sends the first read request REQ1 and the second read request REQ2 to the slave device 130. The slave device 130 processes the first read request REQ1 and the second read request REQ2, respectively generates the first return data RD1 and the second return data RD2, and sends the first return data RD1 and the second return data RD2 to the bridging module 410.

After receiving the first return data RD1 and the second return data RD2, the bridging module 410 combines the first return data RD1 and the second return data RD2 into return data (that is, uses the first return data RD1 and the second return data RD2 as the return data of the same master transaction) according to the first order number 1, the second order number 2, and the number of splitting 2, and sends the return data to the master device 120. As for how to combine the first return data RD1 and the second return data RD2, the foregoing detailed description has been made in conjunction with FIG. 3A, which will not be reiterated here.

Please refer to FIG. 4C. In another embodiment, when the first return data RD1 and the second return data RD2 corresponding to the first read request REQ1 and the second read request REQ2 have not been sent to the master device, the bridging module 410 receives the third read request REQ3 from the master device 120, wherein the third read request REQ3 includes the second master transaction identifier ID_2. The first master transaction identifier ID_1 is different from the second master transaction identifier ID_2. 460 in FIG. 4C illustrates the structure of the third read request REQ3. The third read request REQ3 includes a third slave transaction identifier 462 and a third data address 464. The third slave transaction identifier 462 includes the second master transaction identifier ID_2 and an address L3 of a third location storage space. The bridging module 410 first selects the second location storage table 414_2 according to the second master transaction identifier ID_2 (as shown by a dashed line arrow 468), then allocates the third location storage space with the address L3 for the third return data RD3 corresponding to the third read request REQ3 in the second location storage table 414_2 (as shown by a dashed line arrow 466), allocates the third data storage space with the address E3 for the third return data RD3 in the data storage table 412, and stores the address E3 of the third data storage space into the third location storage space (as shown by a dashed line arrow 418). Then, the bridging module 410 combines the second master transaction identifier ID_2 and the address L3 of the third location storage space as the third slave transaction identifier 462 (ID_2+L3) of the third read request REQ3. It should be noted that since the location storage table 414_1 has been assigned to the first master transaction identifier ID_1, the location storage table 414_1 cannot be assigned to the second master transaction identifier ID_2 here. At this time, the location storage table 414_2 has not been assigned to any master transaction identifier, so the location storage table 414_2 may be assigned to the second master transaction identifier ID_2, and the third location storage space with the address L3 is allocated for the third read request REQ3 in the location storage table 414_2. Then, the bridging module 410 allocates the third data storage space with the address E3 for the third read request REQ3 in the data storage table 412, and writes the address E3 of the third data storage space into the third location storage space with the address L3. The third data address 364 is the starting address A3 of the storage space of the return data RD3 in the slave device 130.

Then, the bridging module 410 sends the third read request REQ3 to the slave device 130. After receiving the third read request REQ3, the slave device 130 generates the third return data RD3 according to the third read request REQ3, and then sends the third return data RD3 to the bridging module 410, wherein the third return data RD3 includes the third slave transaction identifier 462. 470 in FIG. 4C illustrates the structure of the third return data RD3. The third return data RD3 includes the third slave transaction identifier 462 and third data 474. The third slave transaction identifier 462 includes the second master transaction identifier ID_2 and the address L3 of the third location storage space. The third data 474 includes the data D3. The bridging module 410 selects the second location storage table 414_2 according to the second master transaction identifier ID_2 in the third slave transaction identifier 462 included in the third return data RD3 (as shown by a dashed line arrow 478), reads the address E3 of the third data storage space from the second location storage table 414_2, and then stores the data D3 in the third return data RD3 into the third data storage space with the address E3 (as shown by a dashed line arrow 476). As for how the slave device 130 starts to read the data D3 from the address A3 according to the third read request REQ3, generates the third return data RD3 according to the read data D3, and sends the third return data RD3 to the bridging module 410, and how the bridging module 410 stores the third return data RD3, the steps of which are the same as the steps of the processing of the first read request REQ1/the second read request REQ2, which will not be reiterated here.

After storing the third return data RD3, the bridging module 410 may directly send the third return data RD3 to the master device 120 without receiving the first return data RD1 or the second return data RD2. Specifically, since the third return data RD3 and the first return data RD1/the second return data RD2 have different master transaction identifiers, according to the AXI protocol, the bridging module 410 may directly send the third return data RD3 to the master device 120 regardless of whether the first return data RD1/the second return data RD2 has been sent to the master device 120.

According to the bridging module provided by the disclosure, when the bridging module receives multiple read requests with the same master transaction identifier from the master device, the data storage space may be pre-allocated for the return data corresponding to each read request in the receiving order of the read requests, thereby implementing the pre-ordering of the return data. Due to the pre-ordering of the return data, the slave device may send the return data to the bridging module in any order, which not only improves the processing efficiency of the slave device, but also satisfies the requirement of the AXI protocol.

According to the bridging module, the data transmission system, and the data transmission method provided by the disclosure, for the read requests with the same transaction identifier, the bridging module pre-allocates the data storage space for the return data of each read request in the receiving order of the read requests, and then sends the read requests to the slave device. The slave device may send the return data corresponding to the read requests to the bridging module in any order. Then, the bridging module stores the return data into the pre-allocated data storage spaces, and then sends the return data to the master device in the order of the return data in the data storage spaces. In this way, the processing efficiency of the slave device can be improved, and the requirement of the AXI protocol can be satisfied.

Although the disclosure has been disclosed above with the embodiments, the embodiments are not intended to limit the disclosure. Persons skilled in the art may make some changes and modifications without departing from the spirit and scope of the disclosure. Therefore, the protection scope of the disclosure should be defined by the scope of the appended claims.

What is claimed is:

1. A bridging module, coupled between a master device and a slave device, wherein:
    the bridging module obtains a first read request, wherein the first read request comprises a first master transaction identifier;
    the bridging module allocates a first data storage space for first return data corresponding to the first read request according to the first master transaction identifier, and combines the first master transaction identifier and an address of the first data storage space as a first slave transaction identifier of the first read request;
    the bridging module sends the first read request to the slave device;
    the bridging module obtains a second read request, wherein the second read request comprises the first master transaction identifier;
    the bridging module allocates a second data storage space for second return data corresponding to the second read request according to the first master transaction identifier, and combines the first master transaction identifier and an address of the second data storage space as a second slave transaction identifier of the second read request, wherein the first data storage space is adjacent to the second data storage space, and the first data storage space is in front of the second data storage space; and
    the bridging module sends the second read request to the slave device.

2. The bridging module according to claim 1, wherein:
    the slave device generates the second return data according to the second read request, and then sends the second return data to the bridging module, wherein the second return data comprises the second slave transaction identifier;
    the bridging module stores the second return data into the second data storage space according to the address of the second data storage space in the second slave transaction identifier comprised in the second return data;
    the slave device generates the first return data according to the first read request, and then sends the first return data to the bridging module, wherein the first return data comprises the first slave transaction identifier; and
    the bridging module stores the first return data into the first data storage space according to the address of the first data storage space in the first slave transaction identifier comprised in the first return data.

3. The bridging module according to claim 1, wherein the bridging module first selects a first data storage table according to the first master transaction identifier, then allocates the first data storage space for the first return data in the first data storage table, and allocates the second data storage space for the second return data.

4. The bridging module according to claim 1, wherein after receiving the first return data and the second return data from the slave device, the bridging module first selects a first data storage table according to the first master transaction identifier, then stores the first return data into the first data storage space according to the address of the first data storage space, and stores the second return data into the second data storage space according to the address of the second data storage space.

5. The bridging module according to claim 1, wherein after the bridging module stores the second return data into the second data storage space:
    if the first return data has not been received, the bridging module does not send the second return data to the master device; and
    if the first return data has been received, the bridging module sends the first return data to the master device, and then sends the second return data to the master device.

6. The bridging module according to claim 1, wherein the bridging module receives a read request from the master device, and splits the read request into the first read request and the second read request.

7. The bridging module according to claim 6, wherein:
    the bridging module sets an order number of the first read request to a first order number, and combines the first master transaction identifier, the address of the first data storage space, and the first order number as the first slave transaction identifier of the first read request; and
    the bridging module sets an order number of the second read request to a second order number, and combines the first master transaction identifier, the address of the second data storage space, and the second order number as the second slave transaction identifier of the second read request.

8. The bridging module according to claim 7, wherein after receiving the first return data and the second return data from the slave device, the bridging module combines the first return data and the second return data into return data according to the first order number and the second order number, and sends the return data to the master device.

9. The bridging module according to claim 1, wherein:
the bridging module receives a third read request from the master device, and the third read request comprises a second master transaction identifier, wherein the first master transaction identifier is different from the second master transaction identifier;
the bridging module first selects a second data storage table according to the second master transaction identifier, and then allocates a third data storage space for third return data corresponding to the third read request in the second data storage table;
the bridging module combines the second master transaction identifier and an address of the third data storage space as a third slave transaction identifier of the third read request;
the bridging module sends the third read request to the slave device;
the slave device generates the third return data according to the third read request, and then sends the third return data to the bridging module, wherein the third return data comprises the third slave transaction identifier; and
the bridging module stores the third return data into the third data storage space according to the second master transaction identifier and the address of the third data storage space in the third slave transaction identifier comprised in the third return data.

10. The bridging module according to claim 9, wherein after receiving the third return data from the slave device, the bridging module directly sends the third return data to the master device without receiving the first return data or the second return data.

11. A data transmission system, comprising:
a master device;
a slave device; and
a bridging module, coupled between the master device and the slave device, wherein:
the bridging module obtains a first read request, wherein the first read request comprises a first master transaction identifier;
the bridging module allocates a first data storage space for first return data corresponding to the first read request according to the first master transaction identifier, and combines the first master transaction identifier and an address of the first data storage space as a first slave transaction identifier of the first read request;
the bridging module sends the first read request to the slave device;
the bridging module obtains a second read request, wherein the second read request comprises the first master transaction identifier;
the bridging module allocates a second data storage space for second return data corresponding to the second read request according to the first master transaction identifier, and combines the first master transaction identifier and an address of the second data storage space as a second slave transaction identifier of the second read request, wherein the first data storage space is adjacent to the second data storage space, and the first data storage space is in front of the second data storage space; and
the bridging module sends the second read request to the slave device.

12. The data transmission system according to claim 11, wherein:
the slave device generates the second return data according to the second read request, and then sends the second return data to the bridging module, wherein the second return data comprises the second slave transaction identifier;
the bridging module stores the second return data into the second data storage space according to the address of the second data storage space in the second slave transaction identifier comprised in the second return data;
the slave device generates the first return data according to the first read request, and then sends the first return data to the bridging module, wherein the first return data comprises the first slave transaction identifier; and
the bridging module stores the first return data into the first data storage space according to the address of the first data storage space in the first slave transaction identifier comprised in the first return data.

13. The data transmission system according to claim 11, wherein the bridging module first selects a first data storage table according to the first master transaction identifier, then allocates the first data storage space for the first return data in the first data storage table, and allocates the second data storage space for the second return data.

14. The data transmission system according to claim 11, wherein after receiving the first return data and the second return data from the slave device, the bridging module first selects a first data storage table according to the first master transaction identifier, then stores the first return data into the first data storage space according to the address of the first data storage space, and stores the second return data into the second data storage space according to the address of the second data storage space.

15. The data transmission system according to claim 11, wherein after the bridging module stores the second return data into the second data storage space:
if the first return data has not been received, the bridging module does not send the second return data to the master device; and
if the first return data has been received, the bridging module sends the first return data to the master device, and then sends the second return data to the master device.

16. The data transmission system according to claim 11, wherein the bridging module receives a read request from the master device, and splits the read request into the first read request and the second read request.

17. The data transmission system according to claim 16, wherein:
the bridging module sets an order number of the first read request to a first order number, and combines the first master transaction identifier, the address of the first data storage space, and the first order number as the first slave transaction identifier of the first read request; and
the bridging module sets an order number of the second read request to a second order number, and combines the first master transaction identifier, the address of the second data storage space, and the second order number as the second slave transaction identifier of the second read request.

18. The data transmission system according to claim 17, wherein after receiving the first return data and the second return data from the slave device, the bridging module combines the first return data and the second return data into return data according to the first order number and the second order number, and sends the return data to the master device.

19. The data transmission system according to claim 11, wherein:
the bridging module receives a third read request from the master device, and the third read request comprises a second master transaction identifier, wherein the first master transaction identifier is different from the second master transaction identifier;
the bridging module first selects a second data storage table according to the second master transaction identifier, and then allocates a third data storage space for third return data corresponding to the third read request in the second data storage table;
the bridging module combines the second master transaction identifier and an address of the third data storage space as a third slave transaction identifier of the third read request;
the bridging module sends the third read request to the slave device;
the slave device generates the third return data according to the third read request, and then sends the third return data to the bridging module, wherein the third return data comprises the third slave transaction identifier; and
the bridging module stores the third return data into the third data storage space according to the second master transaction identifier and the address of the third data storage space in the third slave transaction identifier comprised in the third return data.

20. The data transmission system according to claim 19, wherein after receiving the third return data from the slave device, the bridging module directly sends the third return data to the master device without receiving the first return data or the second return data.

21. A data transmission method, comprising:
obtaining a first read request, wherein the first read request comprises a first master transaction identifier;
allocating a first data storage space for first return data corresponding to the first read request according to the first master transaction identifier, and combining the first master transaction identifier and an address of the first data storage space as a first slave transaction identifier of the first read request;
sending the first read request to a slave device;
obtaining a second read request, wherein the second read request comprises the first master transaction identifier;
allocating a second data storage space for second return data corresponding to the second read request according to the first master transaction identifier, and combining the first master transaction identifier and an address of the second data storage space as a second slave transaction identifier of the second read request, wherein the first data storage space is adjacent to the second data storage space, and the first data storage space is in front of the second data storage space; and
sending the second read request to the slave device.

22. The data transmission method according to claim 21, further comprising:
generating, by the slave device, the second return data according to the second read request, and then sending the second return data back, wherein the second return data comprises the second slave transaction identifier;
storing the second return data into the second data storage space according to the address of the second data storage space in the second slave transaction identifier comprised in the second return data;
generating, by the slave device, the first return data according to the first read request, and then sending the first return data back, wherein the first return data comprises the first slave transaction identifier; and
storing the first return data into the first data storage space according to the address of the first data storage space in the first slave transaction identifier comprised in the first return data.

23. The data transmission method according to claim 21, further comprising:
first selecting a first data storage table according to the first master transaction identifier, then allocating the first data storage space for the first return data in the first data storage table, and allocating the second data storage space for the second return data.

24. The data transmission method according to claim 21, further comprising:
after receiving the first return data and the second return data from the slave device:
selecting a first data storage table according to the first master transaction identifier; and
storing the first return data into the first data storage space according to the address of the first data storage space, and storing the second return data into the second data storage space according to the address of the second data storage space.

25. The data transmission method according to claim 21, further comprising:
after storing the second return data into the second data storage space:
if the first return data has not been received, not sending the second return data to a master device; and
if the first return data has been received, sending the first return data to the master device, and then sending the second return data to the master device.

26. The data transmission method according to claim 21, further comprising:
receiving a read request from a master device, and dividing the read request into the first read request and the second read request.

27. The data transmission method according to claim 26, further comprising:
setting an order number of the first read request to a first order number, and combining the first master transaction identifier, the address of the first data storage space, and the first order number as the first slave transaction identifier of the first read request; and
setting an order number of the second read request to a second order number, and combining the first master transaction identifier, the address of the second data storage space, and the second order number as the second slave transaction identifier of the second read request.

28. The data transmission method according to claim 27, further comprising:
combining the first return data and the second return data into return data according to the first order number and the second order number, and sending the return data to the master device.

29. The data transmission method according to claim 21, further comprising:
receiving a third read request from a master device, wherein the third read request comprises a second master transaction identifier, wherein the first master transaction identifier is different from the second master transaction identifier;

first selecting a second data storage table according to the second master transaction identifier, and then allocating a third data storage space for third return data corresponding to the third read request in the second data storage table;

combining the second master transaction identifier and an address of the third data storage space as a third slave transaction identifier of the third read request;

sending the third read request to the slave device;

generating, by the slave device, the third return data according to the third read request, and then sending the third return data back, wherein the third return data comprises the third slave transaction identifier; and storing the third return data into the third data storage space according to the second master transaction identifier and the address of the third data storage space in the third slave transaction identifier comprised in the third return data.

30. The data transmission method according to claim 29, further comprising:

after receiving the third return data from the slave device, directly sending the third return data to the master device without receiving the first return data or the second return data.

* * * * *